July 5, 1960

P. KAPTEYN

CIRCUIT SYSTEM FOR ELECTRONIC FLASH INSTRUMENTS WITH TRANSISTORS

Filed Nov. 10, 1958

2,944,191

Inventor:

Paul Kapteyn 2,944,191

CIRCUIT SYSTEM FOR ELECTRONIC FLASH INSTRUMENTS WITH TRANSISTORS

Paul Kapteyn, Berlin-Lichterfelde, am Pfarracker 15, U.S. Sector of Berlin, Germany Filed Nov. 10, 1958, Ser. No. 772,898

Claims priority, application Germany Nov. 13, 1957

4 Claims. (Cl. 315—183)

The invention is directed to an advantageous circuit system for electronic flash instruments using transistors, that is it represents a development of the circuit system formerly used by the applicant.

This circuit system uses transistors for electronic flash instruments and after complete charging of the storage condenser the transistor oscillation is quenched or reduced to a low value until the voltage has sunk to a value just sufficient for discharging the electronic flash lamp with sufficient brightness.

The subject of the present invention is a particularly advantageous design of such a circuit using a transistor as regulating element.

Departing from the principle of the prior circuit system the reduction of the transistor oscillation and with it the desired power economy in the system according to the present invention is achieved not by damping the transformer but by alteration of the base resistance of the oscillating transistor. This is achieved by connecting the emitter-collector track of an additional regulating transistor into the base lead of the oscillating transistor.

The resistance emitter-collector or the "outlet-current" of the regulating transistor is during this influence by controlling the base voltage by the current of a glow discharge lamp, this current giving in the ignited condition of the glow discharge lamp an additional positive primary potential to the base of the regulating transistor, which largely causes blocking for the base current of the oscillating transistor.

The effect is improved by connecting in a condenser of approx. 0.1 to 0.5 $\mu f$ where necessary connecting in a series rheostat between emitter and collector of the regulating transistor, whereby the condenser represents a short circuit or shunt of the emitter-collector track of the regulating transistor for the A.C. currents of the oscillating transistor flowing in the base lead.

The adjustment of the oscillating current and with it the power load of battery and oscillating transistor is performed through a potentiometer or a resistance between base of the regulating transistor and negative pole of the battery in combination with proper rating of the series rheostat to the glow discharge lamp in the charging condenser circuit.

Further details of the invention will be more closely explained in connection with the drawings, i.e. Figs. 1 to 3 show three examples of designs of the circuit according to the invention.

Figure 1:
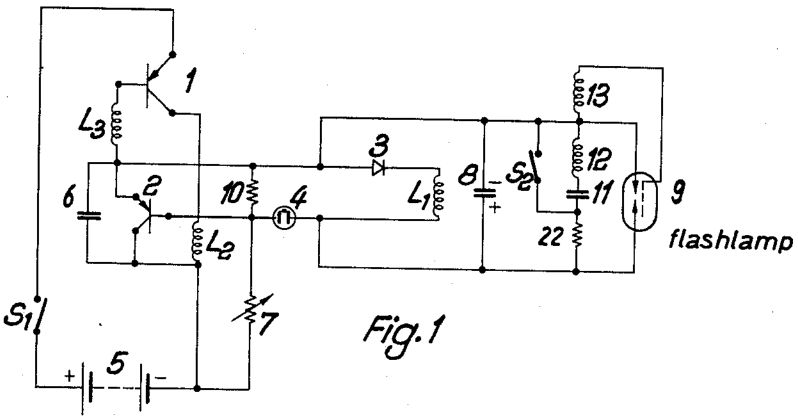
Figs. 1 and 3 show circuits with differently connected primary potential regulating circuits for the regulating transistor.

In Fig. 1 1 represents the oscillating transistor and 2 the regulating transistor. $L_2$ and $L_3$ are the transformer coils in the circuit of the oscillating transistor 1, and $L_1$ is a further winding which lies in the circuit of the rectifier 3 and the glow discharge lamp 4. The battery 5 serves as source of power.

By means of the variable resistance 7 the voltage required for normal working of transistors 1 and 2 is set, in particular the primary potential required at the base of the regulating transistor 2. This primary potential of the base of regulating transistor 2 is influenced, so as to achieve the economizing circuit, by means of bias resistance 10, which at the same time lies in the circuit of glow discharge lamp 4 and of the rectifier 3. The storage capacitor is marked 8, and on the right of this is sketched the actual ignition circuit with the flash lamp 9 and with the ignition switch contact $S_2$.

If the switch $S_1$ is closed when the instrument is put into use, a normal voltage from the battery 5 lies at transistor 1 and regulating transistor 2.

By means of the firmly coupled coils $L_2$ and $L_3$ the transistor circuit oscillates and also simultaneously couples with $L_1$, so that the storage condenser 8 is now charged. When e.g. the minimum voltage necessary for discharging the flash lamp 9 with sufficient brightness is reached at the charging capacitor and thus also at the ignition condenser 11, this voltage is great enough to make the glow discharge lamp 4 in the rectifier 3 circuit conductive. Through this glow discharge lamp current the bias potential at the base of the regulating transistor 2 now becomes more strongly positive in consequence of the voltage drop across resistance 10, so that the current of the regulating transistor 2 is lessened. This lessening influences the circuit of the transistor 1 likewise in the sense of a reduction or quenching of the latter's oscillations. The circuit system is therefore now working as an economic circuit, but is at all times ready for use in consequence of the sufficient charge at the storage condenser 8.

If now through pressure on the flash switch $S_2$ this flash contact is closed, the ignition condenser 11 discharges, and over the Tesla transformer 12, 13 an ignition current impulse is given to the flash lamp 9, which now ignites.

After discharge the glow discharge lamp 4 is no longer conductive, as the charge at 8 has decreased, and so no voltage drop can take place across resistance 10, so that the regulating transistor 2 at its base again receives the required bias potential for normal working, over series resistance 7. The oscillating transistor 1 therefore again works normally and charging capacitor 8 is again charged over winding $L_1$.

It is advantageous to connect in between emitter and collector of the regulating transistor 2 a condenser 13 of approx. 0.1 to 0.5 $\mu f$, where necessary connecting in a series rheostat. This brings about a short circuit or shunt of the emitter-collector track of the regulating transistor 2 for the A.C. currents of the oscillator transistor 1 flowing in the base lead.

The variable series resistance 7 between the base of the regulating transistor and the negative battery pole enables the oscillating current to be adjusted and thus the power loading of battery and oscillating transistor. This variable resistance 7 can also be replaced by a potentiometer 14 (cf. e.g. circuit as in Fig. 3).

In using electrolytic capacitors, e.g. for the charging capacitor, an reactivation is necessary after lengthy disuse, as after switching on anew very high power losses can occur temporarily in the condenser. In transistor flash instruments of small spatial measurements with relatively small and weak batteries this is bound up with a heavy working rate of the batteries and shortens their life.

It is therefore appropriate to arrange the reactivation by means of connection to the mains, cutting out the battery at the same time. The additional control elements necessary here and the connecting cable can at the same time serve to run the transistor instrument entirely without batteries and from the mains only. As the oscillating transformer for this transistor circuit is laid out for a high frequency for the purpose of achieving small measurements, it cannot be brought in for stepping up the mains voltage. On the basis of 220 volts mains voltage the storage condenser (charging capacitor) is to be rated for D.C. of approx. 250 to 350 volts.

Figures 2, 3:
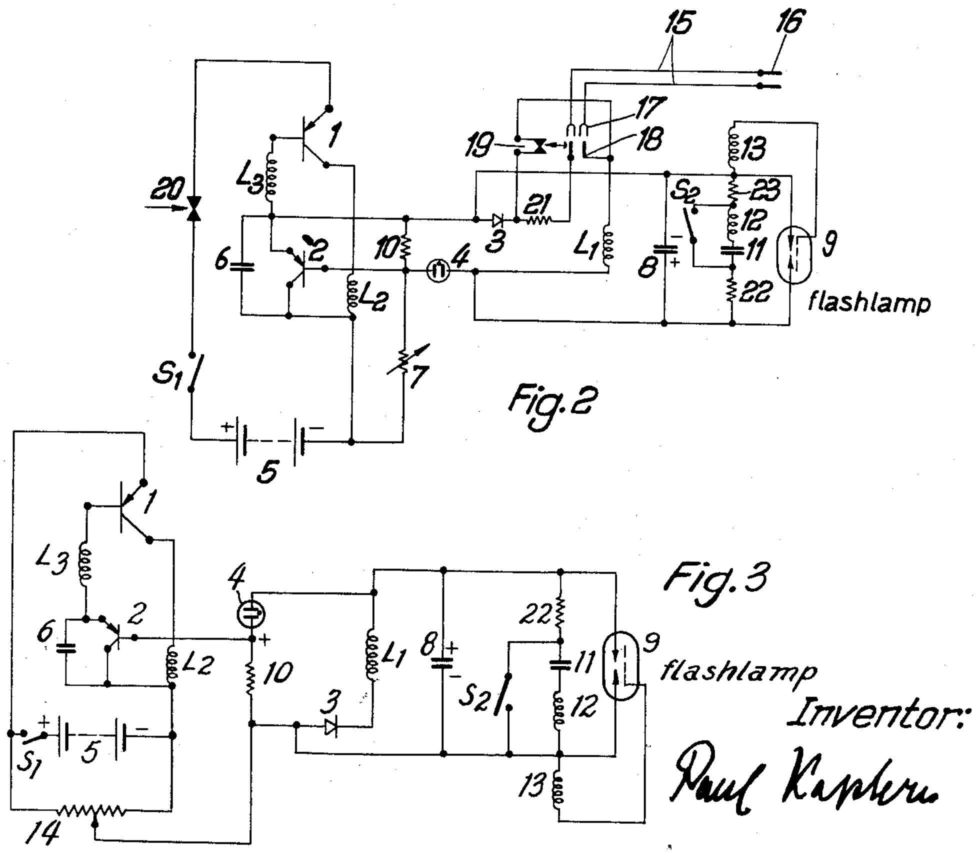
Fig. 2 represents the same circuit as in Fig. 1, merely with the difference that an additional possibility for connection to mains is provided.

In Fig. 2 such a circuit system providing mains connection is represented. In principle this is the same system as in Fig. 1. The same control elements are marked with the same figures or letters. The additional possibility of connecting to mains is indicated by the plug connection lead 15 with the mains plug 16. On the instrument itself there is a plug connection with the plug pins 18, to which the fixture 17 of the mains lead 15 can be plugged. As long as 17—18 are not connected to each other, the system works exactly as described under Fig. 1, above. But if 17—18 are connected and plug 16 is connected to the mains, the contact 19 is automatically first of all interrupted by a buffer. Likewise the contact 20 is simultaneously interrupted, so that in any case independently of the position of the switch $S_1$ the oscillating transistor circuit is also interrupted. Now therefore the mains voltage is connected via the series resistance 21 to the rectifier 3 and to the storage condenser 8, so that now this condenser 8 is charged, by means of the mains voltage. The instrument can therefore now be used for flashing, be it emphasized by means of mains voltage. The flash circuit with the flash lamp 9 here works in exactly the same way when switch $S_2$ is operated, as described under Fig. 1. The series resistances 22 and 23 serve in this case for tactile protection, so as to guarantee operation of the instrument without danger.

If the connection 17—18 is disconnected, the contact arrangements 19 and 20 are closed and the instrument can again be run off the battery 5. As already mentioned, connection to the mains after lengthy disuse enables the electrolytic condenser 8 to be reactivated.

Fig. 3 shows a further example of a design for the circuit system of the transistor flash instrument in accordance with the invention. In this system the master oscillator circuit for the bias potential of the regulating transistor 2 is somewhat different in comparison to the system under Fig. 1. The bias potential at the base of transistor 2 is here taken up by a potentiometer 14 and laid, over series or bias resistance 10, at the base. This series or bias resistance 10 however at the same time lies in the glow discharge lamp circuit of the glow discharge lamp 4 and of the rectifier 3. If therefore the glow discharge lamp 4 ignites, which occurs when condenser 8 is sufficiently charged, a D.C. current flows through the glow discharge lamp circuit, causing an additional voltage drop across the series resistance 10. The upper end of resistance 10 here becomes more strongly positive than before, so that there is therefore a more strongly positive voltage at the base of the regulating transistor 2, which again results in a reduction or quenching of the oscillations in the oscillating transistor circuit 1.

In this case the system works as an current economizing circuit. After release of the flash by operation of $S_2$ the system first of all again works normally, exploiting the full oscillations of the oscillating transistor 1 until the charge at condensor 8 has again become so great that the glow discharge lamp 4 and the current economizing circuit comes into action. This process is repeated after each flash.

The advantage of the above described circuit system in accordance with the invention compared with the ones in the prior circuit arrangement lies in the fact that the current economizing circuit is brought about merely by an alteration in the working conditions of the oscillating transistor instead of damping the oscillations, whereby an additional power loss in the transient range would have to be raised without effective power. The invention is therefore a circuit system with a particularly good degree of effectiveness as against the previous systems.

What we claim is:

1. A current economizing circuit arrangement for electronic flash units comprising a transistor oscillator, a regulating transistor, a coupling transformer with two primary coils and a secondary winding, a rectifier, a glow-discharge lamp, a bias resistance, a storage condenser, and a flash lamp ignition circuit, said transistors and said primary coils being connected together for producing an oscillatory voltage which is inductively coupled to said secondary winding thereby producing in series connection with said rectifier an output voltage for charging said storage condenser which supplies said flash lamp ignition circuit with operating potential by being connected with its terminals to said ignition circuit, said secondary winding and said rectifier being connected in series with said glow-discharge lamp and said bias resistance lying in the emitter-base circuit of said regulating transistor, said glow-discharge lamp thus becoming conductive as soon as the minimum voltage on said storage condenser necessary for the ignition of the flash lamp is reached, and generating by its current across said bias resistance a voltage drop which effects the base potential of said regulating transistor to become more positive, thereby quenching the current of said regulating transistor and interrupting the operation of said oscillatory transistor when the magnitude of the voltage on said storage condenser reaches the ignition voltage for said flash lamp circuit.

2. A current economizing circuit as claimed in claim 1, wherein a variable resistance is connected between the base of said regulating transistor and negative pole of the battery for achieving the desired load of the battery and of the transistor oscillatory circuit.

3. A current economizing circuit as claimed in claim 1, wherein a variable potentiometer resistance is connected in parallel to the battery, the sliding contact of said potentiometer resistance being connected via said bias resistance to said glow-discharge lamp and to the base of said regulating transistor.

4. A current economizing circuit as claimed in claim 1, wherein in parallel connection to said secondary winding and said rectifier a plug connection for mains supply and simultaneously means for disconnecting the circuit connection between said secondary winding and said rectifier and for further disconnecting the battery from the oscillatory transistor circuit are provided.

References Cited in the file of this patent

UNITED STATES PATENTS

| | | |
|---|---|---|
| 2,791,739 | Light | May 7, 1957 |
| 2,854,614 | Light | Sept. 30, 1958 |
| 2,854,615 | Light | Sept. 30, 1958 |